(12) United States Patent
Khosrova et al.

(10) Patent No.: US 8,631,480 B2
(45) Date of Patent: Jan. 14, 2014

(54) SYSTEMS AND METHODS FOR IMPLEMENTING SECURITY SERVICES

(75) Inventors: Eliza Khosrova, Los Angeles, CA (US); Harishankar Karantothu, Mission Viejo, CA (US); Craig Mazzagatte, Aliso Viejo, CA (US); Wei-Jhy Chern, Irvine, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 389 days.

(21) Appl. No.: 13/073,882

(22) Filed: Mar. 28, 2011

(65) Prior Publication Data

US 2012/0254968 A1 Oct. 4, 2012

(51) Int. Cl.
*H04L 9/32* (2006.01)

(52) U.S. Cl.
USPC .......................................................... 726/8

(58) Field of Classification Search
USPC .......................................................... 726/8
See application file for complete search history.

(56) References Cited

U.S. PATENT DOCUMENTS

| 7,516,331 | B2 | 4/2009 | Jin et al. |
| 2005/0114683 | A1* | 5/2005 | Jin et al. ........................ 713/187 |
| 2009/0125989 | A1* | 5/2009 | Flaherty et al. ................... 726/5 |
| 2009/0210925 | A1 | 8/2009 | Ogata |

FOREIGN PATENT DOCUMENTS

| JP | 2002-287990 A | 10/2002 |
| JP | 2009-199234 A | 9/2009 |
| WO | WO 02/065228 | * 8/2002 |

* cited by examiner

*Primary Examiner* — Kambiz Zand
*Assistant Examiner* — Aubrey Wyszynski
(74) *Attorney, Agent, or Firm* — Canon U.S.A., Inc. IP Division (57) ABSTRACT

Systems and methods for providing a login context operate a virtual machine, wherein the virtual machine includes an open services platform and an authentication service, wherein the authentication service includes a classloader, and an initial classloader is designated as the classloader of the authentication service, register a login module, receive an authentication request from a first application, and responsive to receiving the authentication request designate a classloader associated with the login module as the classloader of the authentication service, generate a login context of the login module, and provide the login context of the login module to the first application, whereby the first application uses the login context to perform an authentication.

20 Claims, 6 Drawing Sheets

SYSTEMS AND METHODS FOR IMPLEMENTING SECURITY SERVICES

BACKGROUND

1. Field of the Disclosure

The present disclosure relates generally to authentication.

2. Description of the Related Art

It is often desirable to make computing resources available to only authorized users, for instance to protect against malicious users and programs and to prevent overutilization of the resources. However, the computing resources should be available to authorized users and programs, and different computing resources may need different levels of security. Making the resources available to different users and programs is made more complicated because the resources may need to be accessed across multiple security domains, different security services may be used to secure the resources, and different software platforms may be used to interface with the security services.

Computing environments provide some standardized tools to help solve these issues. In a Java® environment, the Java Authentication and Authorization Service (JAAS) provides a security framework that enables developers to authenticate users and enforce access controls upon users. JAAS also standardizes interfaces and abstracts underlying authentication and authorization mechanisms. JAAS login modules do the actual authentication and authorization. However, login modules need to be determined before or at the time the virtual machine is started because login modules cannot be added or removed dynamically while the virtual machine is running. For example, OSGi platforms require the login modules provided by JAAS to be in the classpath of JAAS. Thus, the login modules must be added to the classpath before the JAVA Virtual Machine is started, which in turn prevents the dynamic addition and removal of login modules.

SUMMARY

In one embodiment, a method for providing a login context comprises starting a virtual machine, wherein the virtual machine includes an open services platform and an authentication service, wherein the authentication service includes a classloader, and an initial classloader is designated as the classloader of the authentication service, registering a login module, receiving an authentication request from a first application, and responsive to receiving the authentication request designating a classloader associated with the login module as the classloader of the authentication service, generating a login context of the login module, and providing the login context of the login module to the first application, whereby the first application uses the login context to perform an authentication.

In one embodiment, a computing device for creating a login context comprises a computer-readable storage device, and one or more processors configured to cause the computing device to perform operations including operating a virtual machine that includes a security platform, registering a first login module while the virtual machine is operating, assigning a first classloader associated with the first login module as a classloader of the security platform, generating a login context of the first login module, and providing the login context of the first login module to a first client application.

In one embodiment, one or more computer-readable media store instructions that, when executed by one or more computing devices, cause the one or more computing devices to perform operations comprising registering a security service while operating a virtual machine, the virtual machine including a security platform, designating a classloader associated with the security service as a classloader of the security platform, generating a context of the security service responsive to receiving a request for a context of the security service from a first application, wherein generating the context of the security service includes invoking the designated security platform classloader, and providing the context of the security service to the first application.

DETAILED DESCRIPTION

The following description is of certain illustrative embodiments, and the disclosure is not limited to these embodiments, but includes alternatives, equivalents, and modifications such as are included within the scope of the claims. Additionally, the illustrative embodiments may include several novel features, and a particular feature may not be essential to practice the systems and methods described herein.

Figure 1:
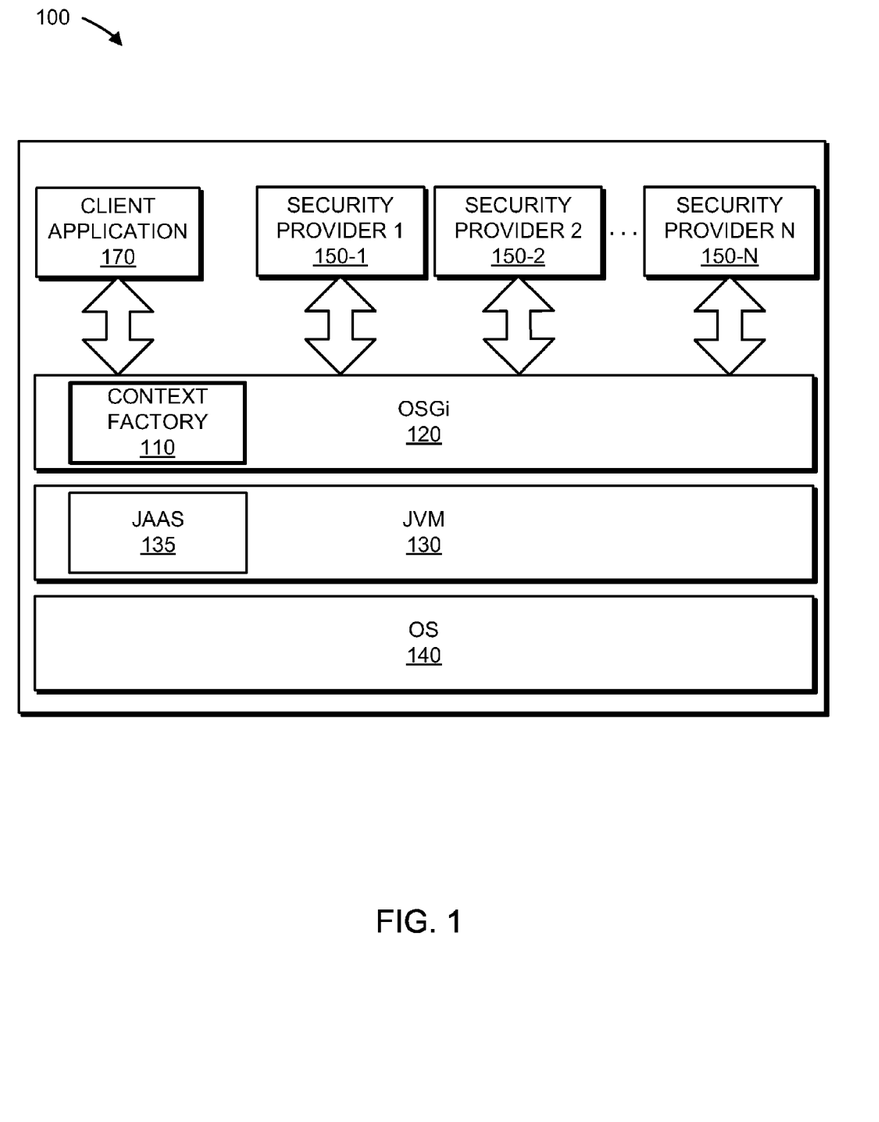
FIG. 1 is a block diagram illustrating one embodiment of a system for implementing security services.

FIG. 1 is a block diagram illustrating one embodiment of a system 100 for modifying security services. The system 100 permits the dynamic addition, modification, and removal of security services in an operating virtual machine, and the system includes an operating system 140 (also referred to herein as "OS"), a Java Virtual Machine 130 (also referred to herein as "JVM"), a Java Authentication and Authorization Service 135 (also referred to herein as "JAAS"), an Open Services Gateway initiative platform 120 (also referred to herein as "OSGi"), and a context factory 110. The system 100 also includes a client application 170 and security providers 1 through N 150-1 to 150-N, where N represents any number of security providers. The OS 140 acts as an intermediary between applications and hardware, manages the sharing of resources of a computing device, provides an interface to access those resources, and provides services for other applications. The JVM 130 is a platform-independent environment that converts code (e.g., JAVA bytecode) into machine language for execution. JAAS 135 implements authentication and authorization services and enforces access controls on applications and users. JAAS 135 allows different modules to be configured into the system, and the different modules can be configured and accessed by applications through the JAAS Application Programming Interface ("API").

The OSGi platform 120 provides a module system and service platform for JAVA and an execution environment that can install, start, stop, update, and uninstall applications and components (also collectively referred to herein as "bundles") without requiring a reboot of the JVM 130. Bundles can make services available to other bundles. A bundle's services are added to a services registry so that other bundles can detect and use them, and the removal of a service from the registry can be used to detect the removal of the service.

The system 100 also includes security providers that make security services available to other applications, modules, bundles, components, etc. FIG. 1 illustrates security providers 1-N (150-1, 150-2 . . . 150-N, also referred to herein as "security providers 150") where N represents any positive integer such that the system is capable of operating with the total number of security providers. The security providers 150 may be implemented in bundles and make their services available as OSGi services (including adding the services to the OSGi services registry). The service providers 150 may include login modules and/or provide services that include JAAS authentication and authorization services. The client application 170 may also be a bundle, and the client application 170 may request one or more services (e.g., authentication, authorization) from the security providers 150.

The system 100 also includes a context factory 110 in the OSGi platform 120. The context factory 110 registers new security providers 150 and facilitates the access of the security services by the client application 170. When a security provider 150 is loaded onto the OSGi platform and started, the context factory 110 registers the security provider 150, including registering any service(s) provided by the security provider 150, and registers a classloader for the service provider and/or service(s). The context factory 110 receives requests for the security service(s) from the client application 170 and returns an interface (e.g., a login context) of the security services to the client application 170. The client application 170 may then interact with the security service(s) and the security provider 150 without the involvement of the context factory 110 (e.g., without the context factory 110 acting as a proxy). Thus, the client application 170 can use the normal API of JAAS 135 to communicate with the security service(s), which simplifies the design of the client application and/or the use of the security service(s).

Figure 2:
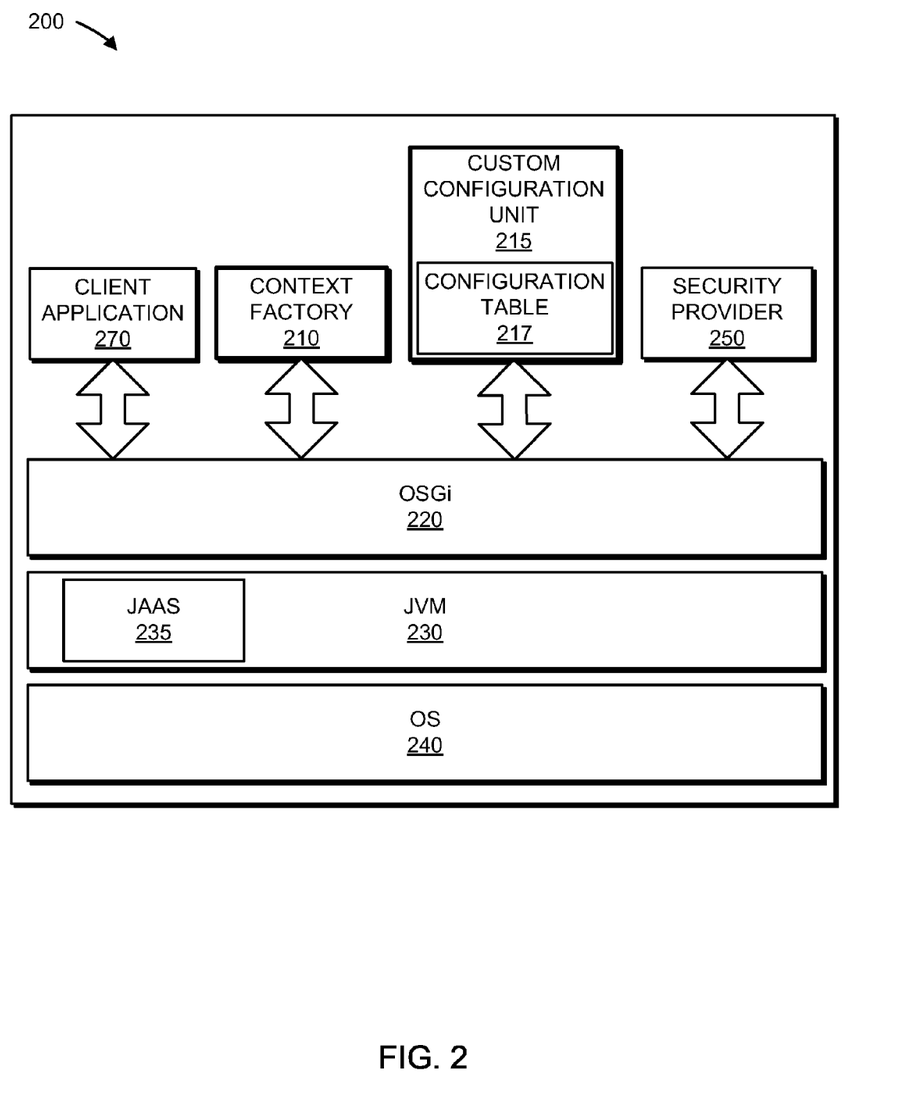
FIG. 2 is a block diagram illustrating one embodiment of a system for implementing security services.

FIG. 2 is a block diagram illustrating one embodiment of a system 200 for implementing security services. The system 200 includes an OS 240, a JVM 230, JAAS 235, an OSGi platform 220, a client application 270, and a security provider 250. Additionally, the system includes a context factory 210 and a custom configuration unit 215. The custom configuration unit 215 registers the services and classloader of the security provider 250. The custom configuration unit 215 includes a configuration table 217 that stores data about the security provider 250, including the classloader and/or the location of the classloader in memory. The data about the security provider 250 may be stored in a respective configuration entry in the configuration table 217. Additionally, in this embodiment, the context factory 210 is a bundle that makes its functionality available to other members of the system as one or more services (including adding the services to the services register). Furthermore, the custom configuration unit 215 is a bundle and may also make its functionality available as one or more services, though in other embodiments the custom configuration unit 215 may not be a bundle (e.g., may be part of the OSGi platform 220). Thus, the system 200 allows the dynamic removal, modification, and addition of the context factory 210 and the custom configuration unit 215 while the JVM is running.

Figure 3:
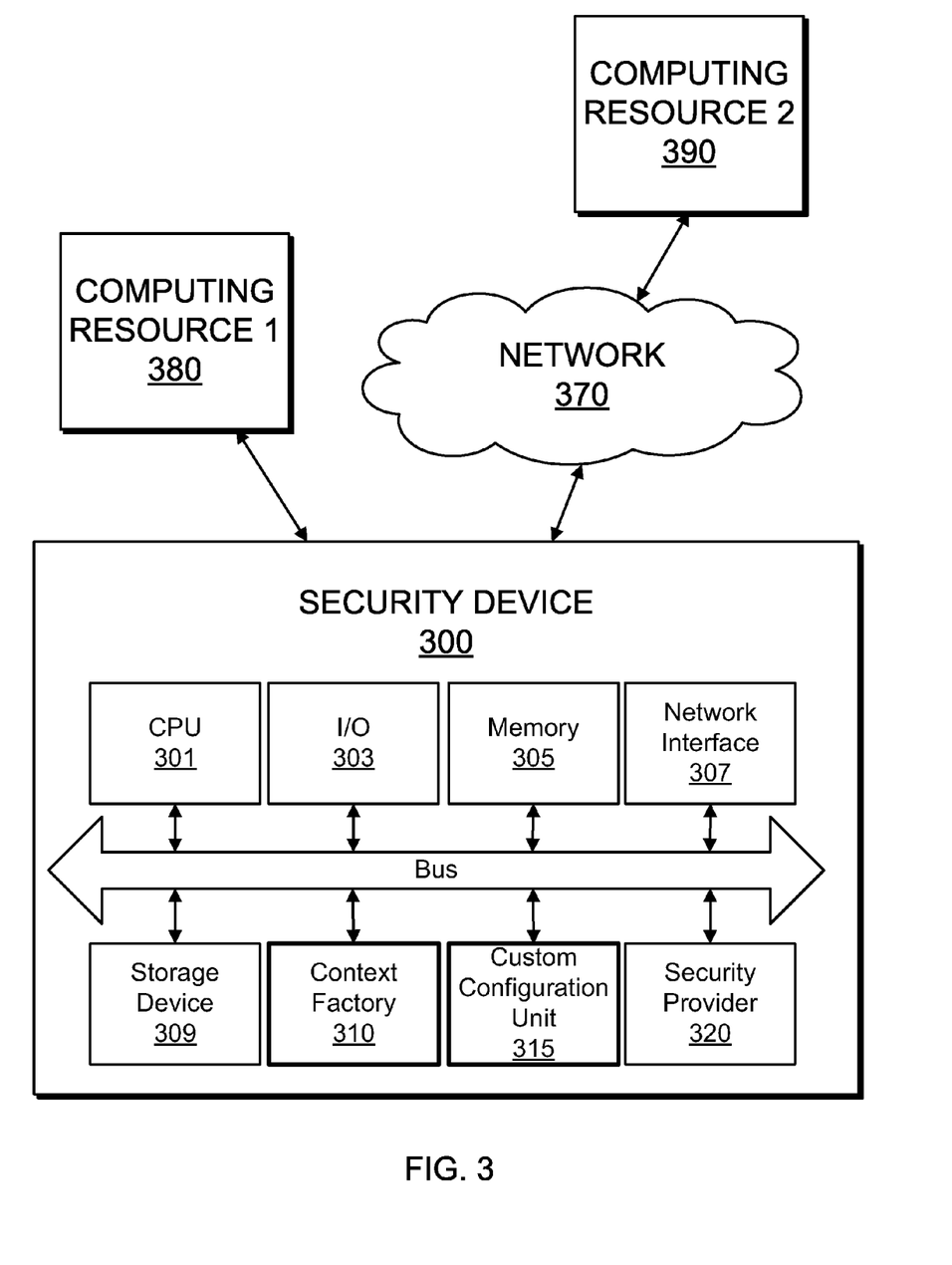
FIG. 3 is a block diagram illustrating one embodiment of a security device.

FIG. 3 is a block diagram illustrating one embodiment of a security device 300. The security device 300 communicates with computing resource 1 380 without a network and with computing resource 2 390 via a network 370. The network 370 may include any combination of networks, including the Internet, WANs, and LANs and any combination of wired or wireless networks. Additionally, the security device 300 communicates with computing resource 1 380 via wired or wireless means, including, for example, USB, Ethernet, serial port, Firewire, Bluetooth, and WiFi.

The security device 300 includes one or more processors 301 (also referred to herein as "CPU 301"), which may be a conventional or customized microprocessor(s). The CPU 301 is configured to read and execute computer readable instructions, and the CPU 301 may command/and or control other components of the security device 300. The security device 300 also includes I/O interfaces 303, which provide communication interfaces to other devices, including a keyboard, a display device, a mouse, a printing device, a touch screen, a light pen, an optical storage device, a scanner, a microphone, a camera, etc. The security device 300 also includes a memory 305, which may be volatile or non-volatile, such as ROM, RAM, and flash memory. The security device 300 further includes a network interface 307 that allows the security device 300 to communicate with the network 370. The storage device 309 stores data or modules and may include, for example, a hard drive, an optical storage device, a diskette, and/or a solid state drive. The components of the security device 300 are connected via a bus. The security device 300 includes an operating system, which manages the hardware, the processes, the interrupts, the memory, and/or the file system of the security device 300.

The security device 300 also includes a context factory 310, a custom configuration unit 315, and a security provider 320. The context factory 310, the custom configuration unit 320, and the security provider 320 may be implemented in computer-executable instructions. Computer-executable instructions may be executed by the security device 300 to cause the security device 300 to perform certain operations, including the methods described herein, though for ease of description a member of the security device 300 may be described as performing the operations. Computer-executable instructions may include logic and may be implemented in software, firmware, and/or hardware. In other embodiments, the context factory 310 and the custom configuration unit 315 may be combined into a single member or further divided into more members.

Figure 4:
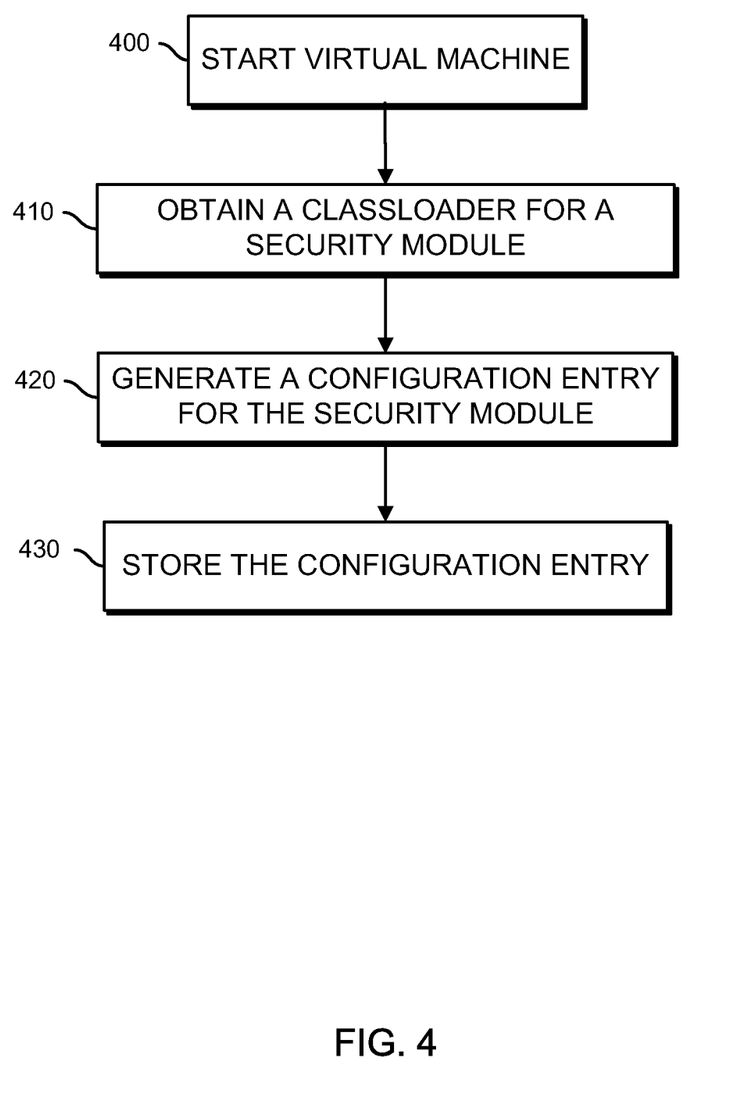
FIG. 4 is a flowchart illustrating one embodiment of a method for adding security services.

FIG. 4 is a flowchart illustrating one embodiment of a method for adding security services. Other embodiments of this method and the other methods described herein may omit blocks, may add blocks, may change the order of the blocks, may combine blocks, and/or may divide blocks into separate blocks. Additionally, the components of the systems and devices shown in FIGS. 1-3 (e.g., the context factory 110, the custom configuration unit 215) may implement the method shown in FIG. 4 and the other methods described herein.

Beginning in block 400, a virtual machine is started, such as a JAVA virtual machine. Next, in block 410, a classloader for a security module is obtained. For example, a security module that includes an associated classloader may be installed as part of a bundle on a virtual machine that includes an OSGi platform, and the security module may provide the classloader to a custom configuration unit as a parameter passed in a method call. Moving to block 420, a configuration entry is generated for the security module. The configuration entry indicates the classloader and associates the classloader with the security module and/or any login contexts that can be provided by the security module. Finally, in block 430, the configuration entry is stored, for example in a configuration table in a memory.

Figure 5:
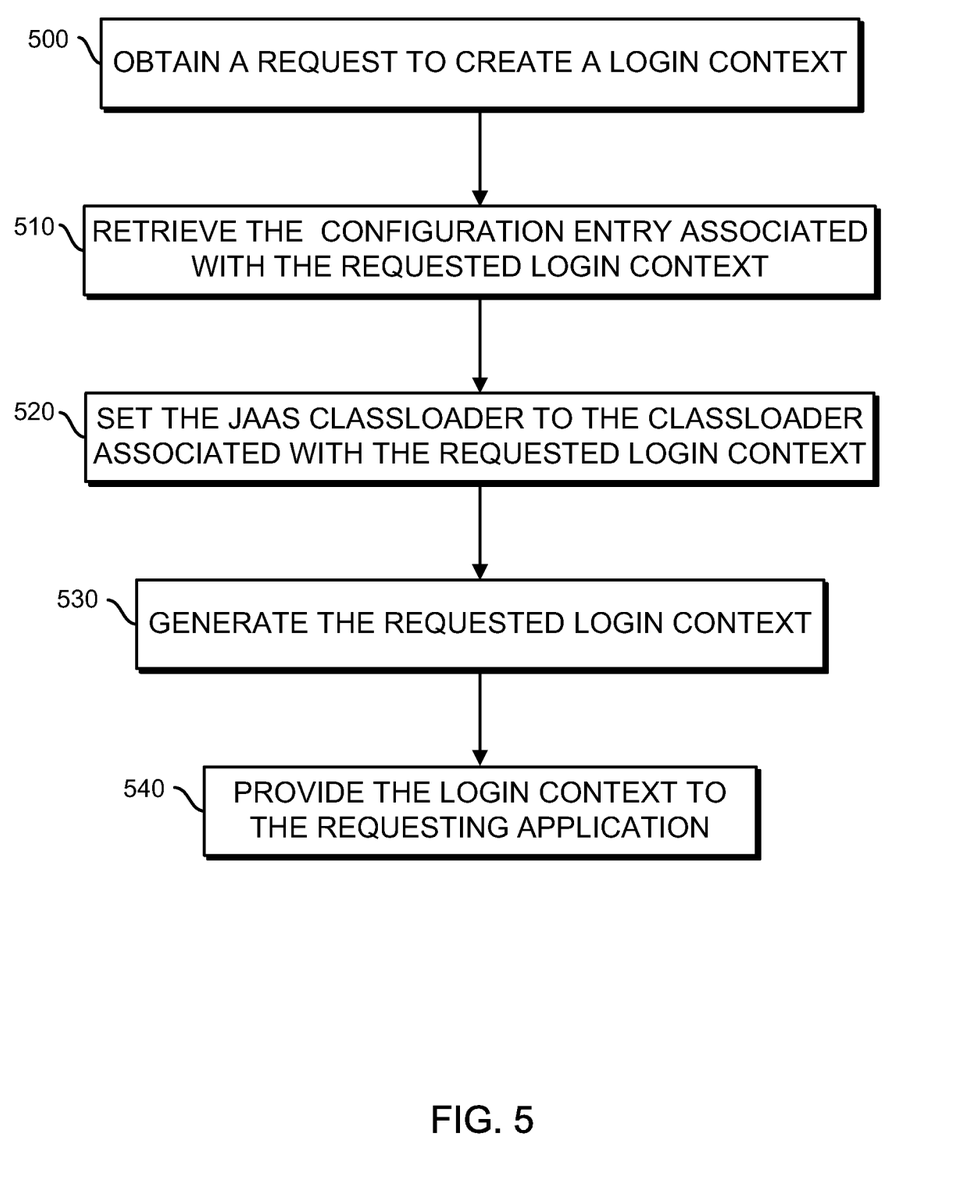
FIG. 5 is a flowchart illustrating one embodiment of a method for generating a login context.

FIG. 5 is a flowchart illustrating one embodiment of a method for generating a login context. Beginning in block 500, a request to create a login context is obtained. The request may include, for example, a method call from a client application, bundle, module, component, etc., such as a Multifunction Embedded Application Platform (MEAP) application, and the request may indicate a desired login context. In block 510, the configuration entry associated with the requested login context is retrieved, for example from a configuration table. Next, in block 520, the JAAS classloader is set to the classloader associated with the requested login context, and in block 530 the requested login context is generated. Finally, in block 540, the login context is provided to the requesting application, bundle, module, component, etc.

Figure 6:
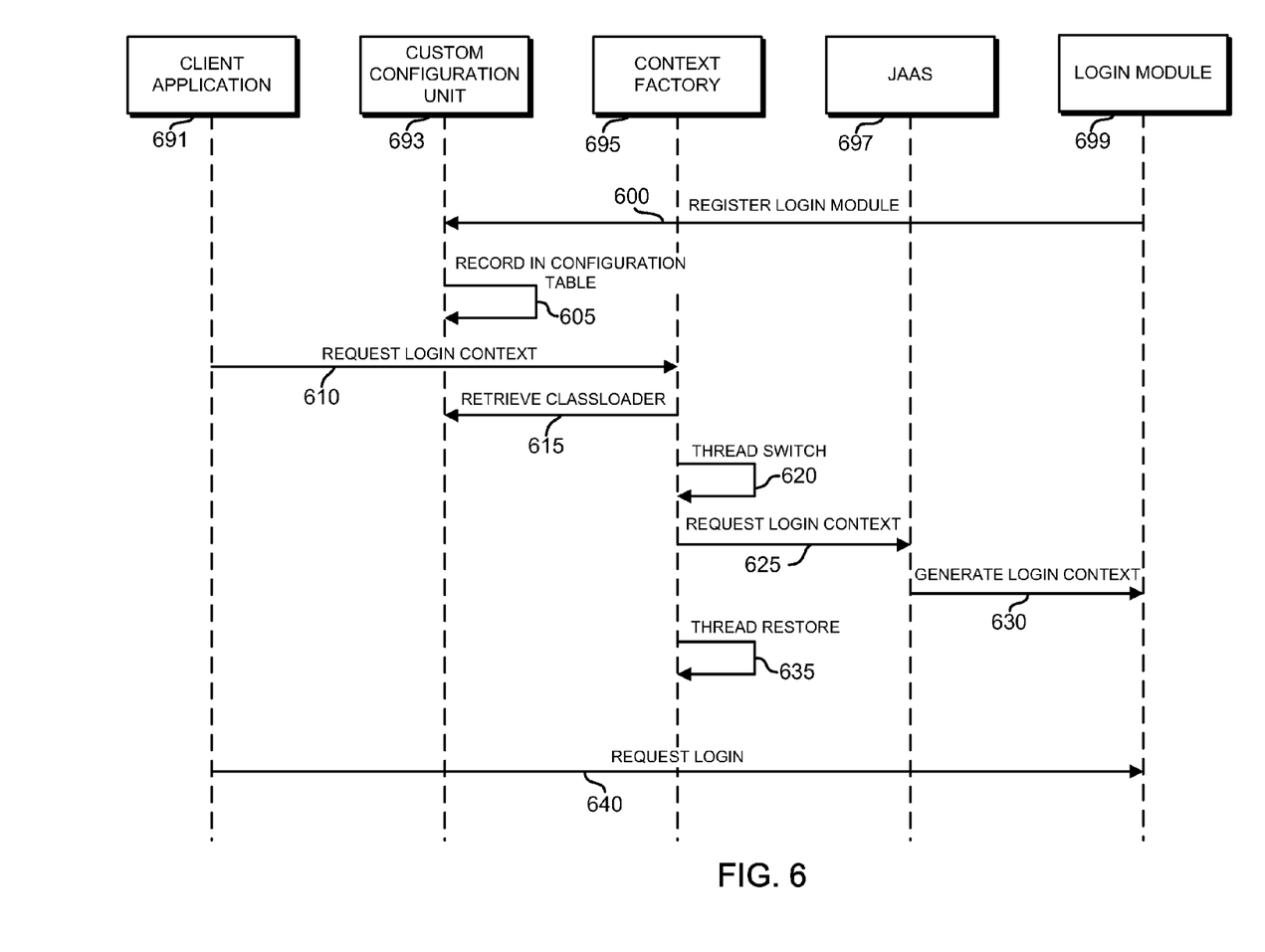
FIG. 6 is a flowchart illustrating one embodiment of a method for generating a login context.

FIG. 6 is a flowchart illustrating one embodiment of a method for generating a login context. In stage 600, a login module 699 is registered with a custom configuration unit 693. Depending on the embodiment, the login module 699 may register itself with the custom configuration unit 693 or another application, module, bundle, etc. may register it (e.g., a bundle that includes the login module). In stage 605, the custom configuration unit 693 records the information associated with the login module in a configuration table.

Next, in stage 610, a client application 691 requests a login context from the context factory 695. In stage 615, the context factory 695 retrieves the classloader for the requested login context from the custom configuration unit 693. Proceeding to stage 620, the context factory 695 performs a thread switch, and then in stage 625 requests the login context from JAAS 697. In stage 630, JAAS invokes the login module 699 to generate the login context, using the classloader and classpath associated with the login module 699. During the thread switch, the context factory 695 and/or JAAS 697 are blocked from attempting to generate additional login contexts. Moving to stage 635, the thread is restored, which permits the context factory 695 and/or JAAS 697 to attempt to generate additional login contexts, and the generated login context is returned to the client application 691. Finally, in stage 640 the client application 691 requests a login from the login module 699 using the returned login context. Using the returned login context, the client application 691 can communicate with the login module and/or JAAS without the use of a proxy. Thus, the client application 691 may use standard JAAS interfaces to perform JAAS authentication.

The above described systems and methods can be achieved by supplying one or more storage media having computer-executable instructions for realizing the above described operations to one or more computing devices (e.g., CPU, MPU) that may read the computer-executable instructions stored in the storage media and execute them. In this case, the computer-executable instructions when read from the storage media and performed by the one or more computing devices execute the operations of the above described embodiments. Thus, the computer-executable instructions or the one or more storage media storing the computer-executable instructions therein constitute an embodiment.

Any applicable computer-readable storage medium (e.g., a floppy disk, a hard disk, an optical disk, a magneto-optical disk, a CD-ROM, a CD-R, a magnetic tape, a non-volatile memory card, semiconductor memory) can be employed as a storage medium for supplying the computer-executable instructions. The computer-executable instructions may be stored in a memory provided on a function-extension board inserted into the computing device or on a function-extension unit connected to the computing device, and a CPU provided on the function-extension board or unit may carry out part or all of the actual processing that realizes the operations of the above-described embodiments. Furthermore, when the computer-executable instructions are executed by the one or more computing devices, an operating system working on the computing system may carry out part or all of the actual processing that realizes the operations of the above described embodiments.

While the above disclosure describes illustrative embodiments, it is to be understood that the invention is not limited to the above embodiments. To the contrary, the invention covers various modifications and equivalent arrangements within the spirit and scope of the appended claims.

What is claimed is:

1. A method for providing a login context, the method comprising:
    starting a virtual machine on a computing device, wherein the virtual machine includes an open services platform and an authentication service, wherein the authentication service includes a classloader, and an initial classloader is designated as the classloader of the authentication service;
    registering a login module, wherein the login module is stored on a computer-readable medium of the computing device;
    receiving an authentication request from a first application; and
    responsive to receiving the authentication request
        designating a classloader associated with the login module as the classloader of the authentication service, wherein the classloader associated with the login module is different than the initial classloader,
        generating a login context of the login module using the classloader associated with the login module, and
        providing the login context of the login module to the first application, whereby the first application uses the login context to perform an authentication.

2. The method of claim 1, wherein the open services platform is OSGi.

3. The method of claim 2, wherein the login module is a bundle.

4. The method of claim 1, wherein the authentication service is JAAS.

5. The method of claim 1, wherein registering the login module includes associating a classloader with the login module.

6. The method of claim 1, wherein the authentication request includes data indicating the login module.

7. The method of claim 6, further comprising:
    receiving a registration request from a second login module;
    responsive to the registration request from the second login module, registering the second login module;
    receiving a second authentication request from a second application; and
    responsive to receiving the second authentication request,
        designating a classloader associated with the second login module as the classloader of the authentication service, wherein the classloader associated with the second login module is different from the initial classloader
        generating a login context of the second login module using the classloader associated with the second login module, and
        providing the login context of the second login module to the second application.

8. The method of claim 7, wherein the second authentication request includes data indicating the second login module.

9. The method of claim 1, further comprising redesignating the initial classloader as the classloader of the authentication service after generating the login context of the login module.

10. A computing device for creating a login context, the computing device comprising:
  a computer-readable storage device; and
  one or more processors configured to cause the computing device to perform operations including
  operating a virtual machine that includes a security platform, wherein an initial classloader is designated as the classloader of the security platform,
  registering a first login module while the virtual machine is operating,
  assigning a first classloader associated with the first login module as a classloader of the security platform, wherein the first classloader is different than the initial classloader,
  generating a login context of the first login module using the first classloader, and
  providing the login context of the first login module to a first client application.

11. The computing device of claim 10, wherein the operations further include
  registering a second login module while the virtual machine is operating;
  assigning a second classloader associated with the second login module as the classloader of the security platform, wherein the second classloader is different from the initial classloader and the first classloader;
  generating a login context of the second login module using the second classloader; and
  providing the login context of the second login module to a second client application.

12. The computing device of claim 11, wherein
  the login context of the first login module is generated in response to receiving from the first client application a first request for a login context that identifies the first login module; and
  the login context of the second login module is generated in response to receiving from the second client application a second request for a login context that identifies the second login module.

13. The computing device of claim 11, wherein registering the first login modules includes associating the first classloader with the first login module; and registering the second login module includes associating the second classloader with the second login module.

14. The computing device of claim 11, wherein the first login module implements a different security protocol than the second login module.

15. The computing device of claim 10, wherein the operations further include restoring the classloader of the security platform to an initial security platform classloader.

16. One or more non-transitory computer-readable media storing instructions that, when executed by one or more computing devices, cause the one or more computing devices to perform operations comprising:
  registering a security service while operating a virtual machine, the virtual machine including a security platform, wherein an initial classloader is designated as the classloader of the security platform;
  designating a first classloader associated with the security service as a classloader of the security platform;
  generating a login context of the security service responsive to receiving a request for a login context of the security service from a first application, wherein generating the login context of the security service includes invoking the first classloader; and
  providing the login context of the security service to the first application.

17. The one or more non-transitory computer-readable media of claim 16, wherein the request for a login context of the security service indicates the security service.

18. The one or more non-transitory computer-readable media of claim 17, wherein the virtual machine operates an open services platform.

19. The one or more non-transitory computer-readable media of claim 16, wherein registering the security service includes associating the first classloader with the security service.

20. The one or more non-transitory computer-readable media of claim 16, wherein the operations further comprise designating the initial classloader as the classloader of the security platform after generating the login context of the security service.

* * * * *